Nov. 11, 1958 A. HALLUM 2,859,558
COLLAPSIBLE TRANSPLANTING WALL
Filed July 3, 1956

INVENTOR.
*Andrew Hallum*

BY *Victor J. Evans & Co.*

ATTORNEYS

United States Patent Office 2,859,558
Patented Nov. 11, 1958

2,859,558

COLLAPSIBLE TRANSPLANTING WALL

Andrew Hallum, Springfield, Mo.

Application July 3, 1956, Serial No. 595,756

1 Claim. (Cl. 47—37)

This invention relates to horticulture and particularly transplanting small plants, trees, and the like wherein it is desired to hold the soil around the roots to prevent destroying small feelers extended from the roots, and in particular a sectional casing including straight or arcuate plates with intermediate plates having a rod on one edge and a hook on the opposite edge for receiving the rod of an adjoining section and with a starting section having rods on both edges and a finishing section with hooks on both edges.

The purpose of this invention is to provide means for preventing soil dropping away from roots in transplanting plants, trees, and the like whereby the entire unit of soil around a plant is moved, with the plant, from one location to another.

Various types of devices have been provided for holding soil around roots of plants, trees, and the like, however, the most common method of retaining the soil in position around roots of a plant, tree, or the like is to wrap burlap around the soil and bind the burlap in the form of a ball. By this method at least some of the soil drops away from the roots pulling the fine feelers from the roots from which they extend and thereby making it necessary to prune the plant or tree heavily to compensate for the number of roots lost. With this thought in mind this invention contemplates a sectional wall adapted to be driven into the ground around the plant or the like wherein with the wall in position soil is removed from the outside leaving a complete unit, undisturbed, on the inside and around the roots of a plant. By inserting a plate below the form, the plant with the soil in place, may readily be transported from one position to another.

The object of this invention is, therefore, to provide means for assembling a plurality of units to form a wall around the roots of a plant whereby all soil within the form remains in contact with roots of a plant around which the device is positioned so that the soil is not pulled away from the roots in transplanting.

Another object of the invention is to provide a collapsible form for holding soil around roots of plants, trees, and the like to facilitate transplanting in which the form is adapted to be moved and reused, after the tree or plant is planted in the ground.

A further object of the invention is to provide an improved collapsible casing for retaining soil around roots of plants in transplanting in which the casing is of a simple and economical construction.

With these and other objects and advantages in view the invention embodies a plurality of plates adapted to be assembled to form a wall with rods on edges of some of the plates and hooks adapted to receive the rods on edges of other of the plates whereby the plates are adapted to be driven into the ground to form a wall of interlocking elements.

Other features and advantages of the invention will appear from the following description taken in connection with the drawing, wherein.

Figure 2:
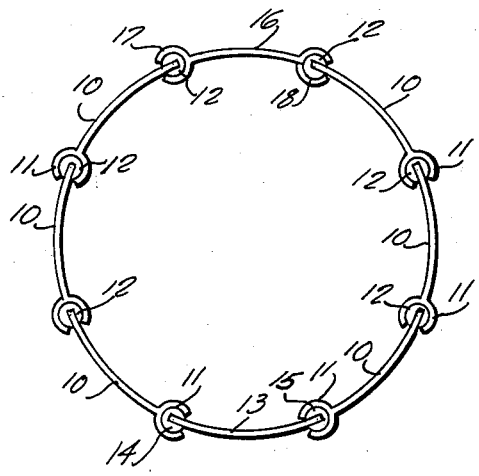
Figure 2 is a plan view of the form shown in Fig. 1.

Referring now to the drawing wherein like reference characters denote corresponding parts the improved collapsible transplanting wall of this invention includes a plurality of elongated body plates 10 having split tubular elements providing hooks 11 on one of the edges thereof and with rods 12 on the opposite edges and, as illustrated in Fig. 2 the device may be provided with a key plate 13 having rods 14 and 15 on the ends and also a locking plate 16 having hooks or sockets 17 and 18 on the ends.

Figure 1:
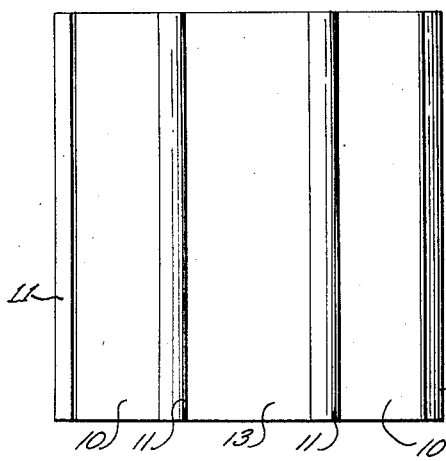
Figure 1 is a side elevational view showing the improved collapsible transplating form.
Figure 4:
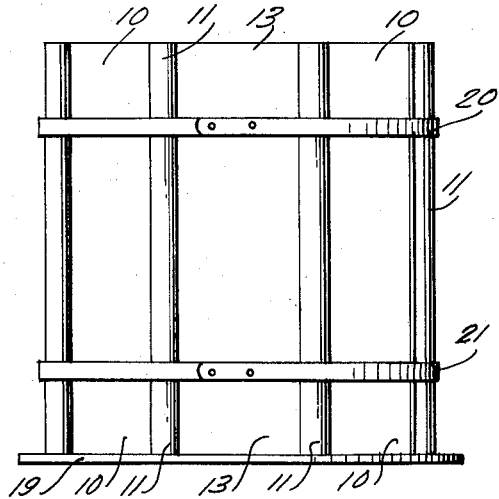
Figure 4 is a side elevational view similar to that shown in Fig. 1 showing bands extended around the units of the form and also showing a plate extended across the lower end of the form.

With the parts assembled as illustrated and described in Figs. 1, 2 and 4 a form or wall is provided which, with soil packed therein, provides a complete unit retaining soil in position around roots of a plant, tree, or the like.

In assembling the unit, particularly as shown in Fig. 2 the plate 13 with the rods 14 and 15 on edges thereof is first driven into the soil and at a predetermined distance from the stem of a plant, or the like, and with the plate 13 in position plates 10 having hooks 11 on one of the edges thereof and rods 12 on the opposite edges, are driven into the soil with the hooks 11 positioned over the rods 14 and 15 of the plate 13 whereby the parts are assembled as driven into the soil.

Additional plates 10 are added with the hooks of the plates positioned over the rods of adjoining plates until the form is substantially complete and, at this point, the plate 16 with hooks 17 and 18 on edges thereof is driven over the rods 12 of the adjoining plates whereby a complete wall is provided.

With the wall in position soil is removed from the outside whereby a complete unit of soil around roots of a plant is held together by the wall and, as a safeguard, a plate 19 is inserted below the lower edge of the wall to insure the soil remaining in the form.

Also, with the sections of the wall assembled and inserted in the soil whereby the interior of the wall is substantially filled with soil, bands 20 and 21 are installed around the sections to insure retaining the sections in assembled relation. With the soil retained in the wall by the plate 19 and bands 20 and 21 a unit, having a plant or tree therein may readily be transported from one location to another.

Figure 3:
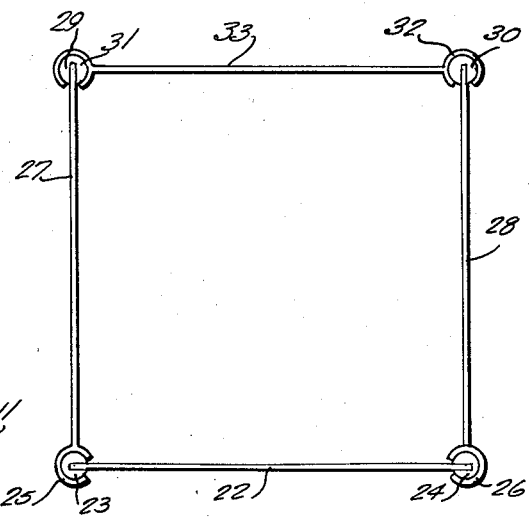
Figure 3 is a plan view illustrating a modification wherein the plates are positioned at right angles and wherein straight plates are used.

In the design illustrated in Fig. 3 a plate 22 with rods 23 and 24 on the ends is provided as a keyplate and hooks 25 and 26 of side plates 27 and 28 are placed over the rods 23 and 24 with rods 29 and 30 at the opposite ends positioned in hooks 31 and 32 of a locking plate 33 at the side of the form opposite to that on which the plate 22 is positioned.

The collapsible transplanting form or wall may, therefore, be formed with straight or arcuate plates and the plates may be of various types and designs.

It will be understood that modifications, within the scope of the appended claim, may be made in the design and arrangement of the parts without departing from the spirit of the invention.

What is claimed is:

In a collapsible transplanter, a plurality of similar body plates each having an enlargement on one of its edges and an open socket on its other edge, said plates being arranged so that the sockets receive the enlargements of adjacent plates, a key plate having an enlargement on each edge thereof, a locking plate having a socket on each edge thereof, said body plates, key plate and locking plate being arranged in circular formation so that the enlargements and sockets releasably interfit and engage each other and whereby accidental separation of the plates is prevented, the plates defining a continuous circular form for retaining soil in position around roots of a plant, tree or the like, a horizontally disposed plate member arranged below the form to insure that the soil remains in the form, and a pair of spaced parallel bands surrounding the plates for maintaining the plates in their proper assembled positions.

References Cited in the file of this patent

UNITED STATES PATENTS

| | | |
|---|---|---|
| 352,146 | Oungst | Nov. 9, 1886 |
| 397,732 | Landis | Feb. 12, 1889 |
| 1,031,713 | Hills | July 9, 1912 |
| 2,001,473 | Smith | May 14, 1935 |
| 2,219,690 | Leydecker | Oct. 29, 1940 |
| 2,219,870 | Jacobus | Oct. 29, 1940 |